H. MAXIM.
POSITION INDICATOR OR RECORDER.
APPLICATION FILED DEC. 15, 1914.
1,310,200.
Patented July 15, 1919.
2 SHEETS—SHEET 2.
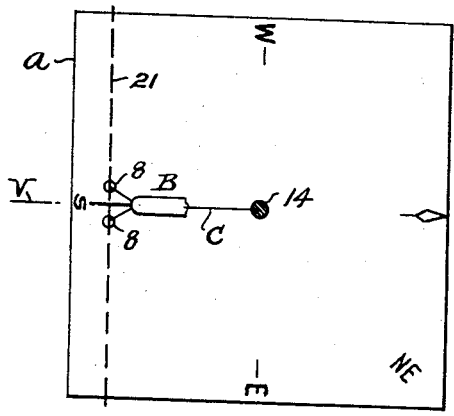
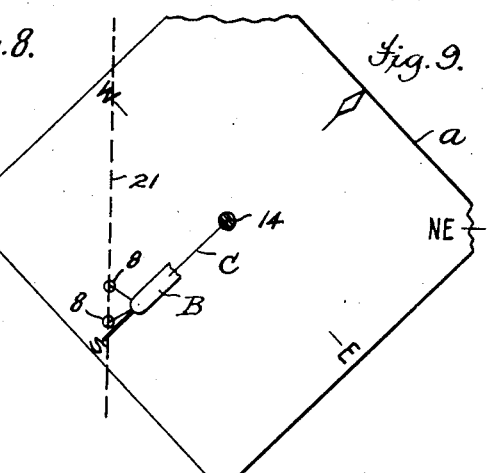
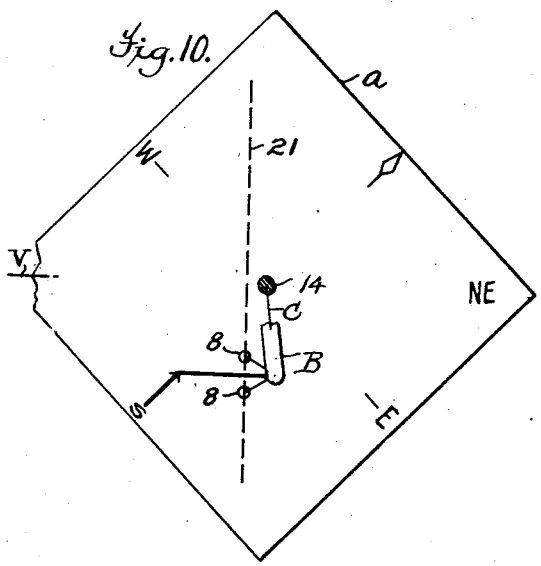
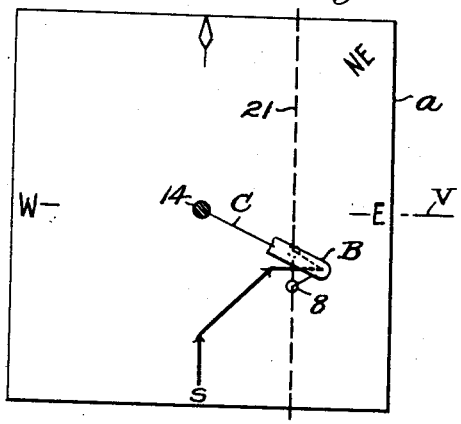
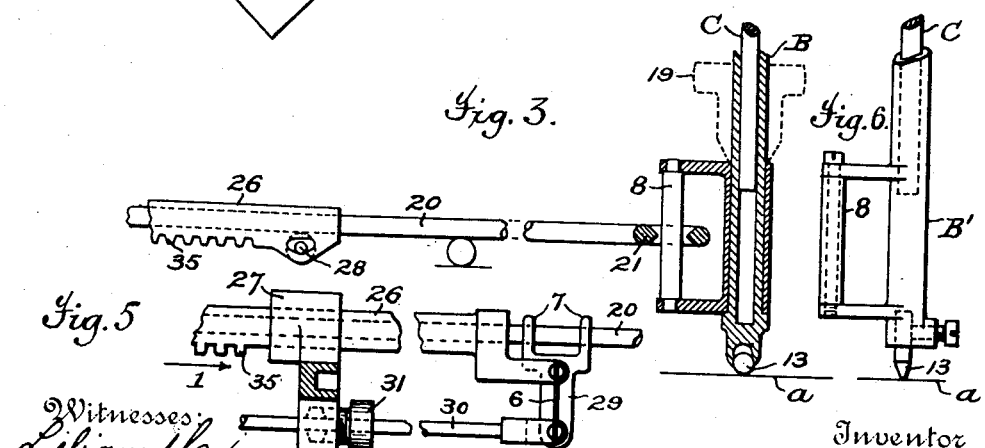
Witnesses:
Lilian Maxim
Geo. H. Graham
Inventor
Hudson Maxim

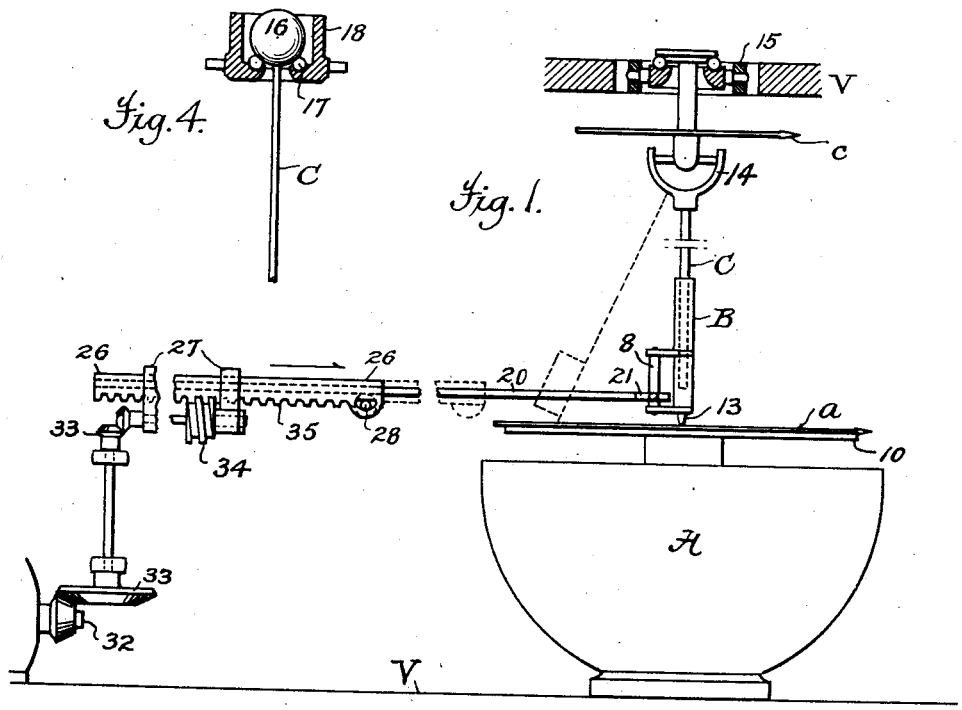
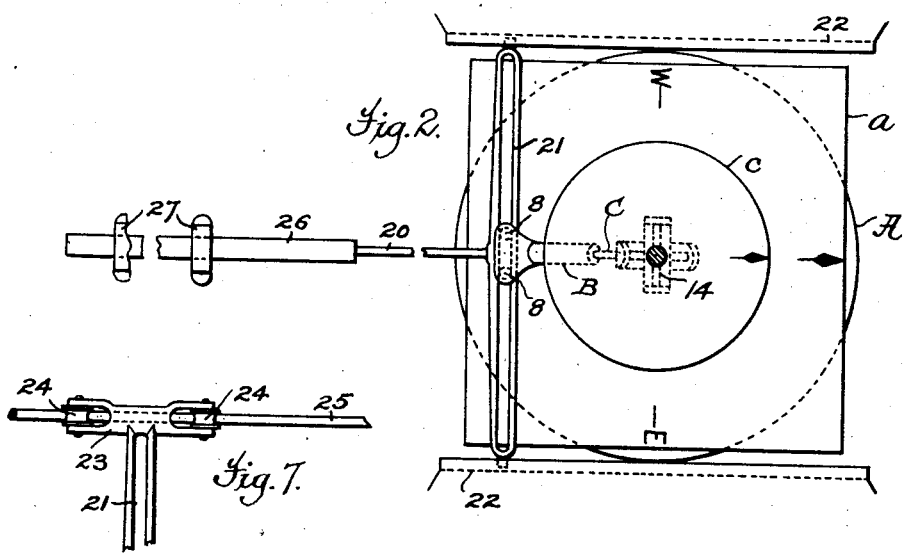

UNITED STATES PATENT OFFICE.

HUDSON MAXIM, OF HOPATCONG BOROUGH, NEW JERSEY.

POSITION INDICATOR OR RECORDER.

1,310,200.   Specification of Letters Patent.   Patented July 15, 1919.

Application filed December 15, 1914. Serial No. 877,328.

*To all whom it may concern:*

Be it known that I, HUDSON MAXIM, a citizen of the United States, residing in the borough of Hopatcong, Sussex county, and State of New Jersey, have invented certain new and useful Improvements in Position Indicators or Recorders, of which the following is a description.

The object of the invention is mainly, to indicate upon a map or chart, as nearly as practicable, the exact geographical position at all times of the vehicle, vessel or other conveyance employing the indicator, especially submarines.

In carrying out the invention, I employ a map or chart, fixed with respect to the mariner's compass, that is to say the north of the chart is maintained in its north position no matter the direction of the vehicle, with which is combined a recording or indicating stylus or marker supported by the vehicle, and consequently movable with it with respect to a magnetically or gyroscopically fixed chart with respect to north and south, with means for moving the stylus or marker on the chart, one with respect to the other, proportionately to the speed of the vehicle, so that the stylus not only records the movement of the vehicle but also its direction of travel.

In practice I prefer to employ a gyroscopically north and south maintained compass, and what is in effect a mariner's compass, and on the card or table of which compass a map or chart, suited to the location, is supported and attached. Above the chart, the vessel or other vehicle supports a universally mounted long, pendulous rod, carrying at its lower end a stylus or marker bearing on the chart. Preferably, the stylus is capable of being moved over the chart by suitable connections with some operable part of the vehicle or vessel, or some part operable with the vehicle, such as the log, or the motive power or propelling mechanism of the vehicle, so that as the vehicle moves through the water or air or on the land, the stylus moves proportionately over the chart, with the result that the distance traveled, as well as the direction of travel and location of the vehicle will be indicated on the chart.

In the preferred construction, the stylus is arranged to move in line or in parallel line with the longitudinal axis of the vehicle; and whenever a change of direction of the vehicle may occur, the chart remaining magnetically or gyroscopically fixed as to north and south, the stylus also remains in a fixed position on the chart while the direction of the vehicle is changing, ready to continue its recording movement in harmony with the direction of travel of the vehicle.

The connections between the recording stylus and the operable part of the vehicle, motive power or propelling mechanism or log of a vessel in the preferred form are such that the stylus will be moved forward as the vehicle is moved forward, and they are also such that in any change of course of the vehicle or vessel, that the stylus will move or be forced to move independently of its operative part or motive power or propelling mechanism so that if the course of the vehicle be changed, however much, even if turned completely around, the stylus will remain constantly in a substantially fixed position on the map or chart, but when the vehicle moves forward again, it will continue to record the course or direction of travel of the vessel upon the map or chart. When, however, the vessel turns while moving forward, the stylus will move forward, thereby describing a curved line upon the map, corresponding to the curved course of the vessel.

The accompanying drawings illustrate a practical embodiment of the invention, in which drawings:

Figure 1, is a side elevation thereof, parts being foreshortened to accommodate the view to the sheet;

Fig. 2, is a plan view;

Fig. 3, is an enlarged vertical sectional detail;

Fig. 4, is a sectional detail of a modified form of the universal joint supporting the pendulous stylus-carrying rod;

Fig. 5, is an enlarged elevation, foreshortened, of a modified form of the clamping connection between the driving sleeve and the driven stylus-moving rod;

Fig. 6, is an elevation of a modified form of the stylus carrier;

Fig. 7, is a plan view of one end of a modified form of the anti-friction guide for the slotted head of the driven stylus-moving rod;

Figs. 8, 9, 10 and 11 are diagrams of the recording movements of the stylus.

Referring to said drawings, Figs. 1 and 2, the mariner's compass A, the gyroscope form being preferred, is supported, say on any point on the longitudinal axis of the vessel V, with its compass card or table 10, carrying the map or chart a, the north of the chart being fixed with respect to the north of the compass, and consequently fixed with respect to any direction or change in direction of the movement of the vessel.

The carrier B, with its recording stylus 13, bearing on the chart, is mounted at the lower end of a pendulous rod C, whose upper end is supported by the vessel on a universal joint 14, carried by gimbals 15, as is the chart, so that the stylus will constantly bear on the chart. In the modification Fig. 4, the upper end of the stylus-carrying rod C, is provided with a ball 16, which rests on a race of small balls 17, in the housing 18, that is supported and connected to the vessel through the usual gimbals as in Fig. 1, which not only provide a comparatively frictionless support for the rod C, but by reason of the gimbals maintain it constantly horizontally parallel with the compass-supported chart.

The stylus-holding carrier B, Figs. 1 to 3 and the carrier B¹, Fig. 6 is loosely sleeved on the lower end of the pendulous rod C for freedom of vertical and also turning movements thereon, so that the stylus is held solely by gravity against the surface of the chart. The weight of the carrier B and B¹ may, however, be augmented by a weighted sleeve 19, indicated by dotted lines in Fig. 3, so that its stylus 13, may not only make a stronger impression on the surface of the chart, but is rendered less liable to exterior vibration.

The lower end of the rod C, and preferably the stylus carrier B, is loosely engaged by a motive power driven rod 20, by which the stylus 13, is moved over the surface of the chart proportionately with the speed of the vessel or other vehicle. To allow, however, for the many changes in the course of the vessel, there is provided a lateral slip or sliding connection between the stylus and its driven rod 20, which, in this instance is formed by a slotted head 21, extending transversely of the vessel and of the travel of the rod. The slotted head is properly guided at each end in anti-friction runways 22, Fig. 2, and thus caused to move accurately and freely in right line with the rod. In the modification Fig. 7, the slotted head 21, is connected at each end to a guide 23 supporting separated anti-friction rolls 24, resting on and freely movable over a guide 25 fixed to the vessel. The slotted head 21, also, engages a pair of widely separated pins or studs 8, supported by arms on the stylus carrier B, so that no matter the lateral position of the stylus with respect to the longitudinal axis of the driven rod the stylus will be moved in unison therewith. The pins 8, of roller form are of a length to permit freedom of vertical movement of the stylus carrier with respect to the driving rod head 21, as well as to accommodate the connection to the roll and pitch of the vessel and also when the stylus assumes any extreme angle to the vertical in traveling over the chart.

The driven rod 20, is mounted to freely slide within a longitudinally movable driving sleeve 26, that is suitably supported and guided in a bearing 27, fixed to the vessel. The construction being such that when the vessel rotates with respect to the chart, and no appreciable forward or backward movement of the vessel occurs, the stylus will remain practically stationary on the chart due to frictional contact therewith, free sliding of the rod in the sleeve 26 being permitted until such time as the longitudinal movement of the vessel is resumed, or in other words until it proceeds on its course.

To permit this free movement of the driven rod 20, with respect to the driving sleeve 26, there is provided a suitable clutch or tight and loose connection between the two, arranged so that when the sleeve is moved longitudinally through its bearing 27, the rod will be coupled to it, and then both moved as a unit, but when the change in direction of the vessel is more rapid than the longitudinal driving movement of the sleeve, the rod will be free to move irrespective and independent of the sleeve. Such a clutch connection may be a simple ball 28 carried to roll up inclined slots in the sleeve 26, Fig. 3, but, preferably as in Fig. 5, is represented by a depending dog 29, pivoted to the sleeve 26, and having two widely separated eyes 7, embracing the rod 20, which when the dog hangs vertically with its eyes parallel with the axis of the rod, allows the rod to slide freely through them, but when the dog is moved the slightest extent out of vertical, its eyes will clutch the rod and thus positively connect the rod and sleeve together. This clutching or clamping movement of the dog to the rod 20, may be had by a stem 30, pivotally connected to the depending portion of the dog with its free end extending parallel with the sleeve, and passing slidably through a friction device represented by a stuffing box or gland 31, that is supported by the bearing 27, and made adjustable to vary the degree of friction exerted on said stem. In operation it will be obvious that, say, when the sleeve 26, is moved forward in the direction of the arrow 1, Fig. 5, the drag or friction on the stem 30, will cause the dog to be very slightly rocked, so that its eyes clamp or clutch the rod 20, thus coupling the sleeve and rod together; and that the least tendency of the rod to move independently of the sleeve, and hence of the dog, will for the time being render the clutch of the dog ineffective. This unclutching of the dog from the rod may be rendered more effective by the use of a suitable spring 6, tending to hold the dog vertical with respect to the sleeve as soon as its driving action ceases or is sufficiently less during the turning movement of the vessel so that the stylus will remain fixed on the chart.

The driving sleeve 26, may of course be moved longitudinally proportionately to the movement of the vessel by suitable connections with the vessel's motive power, propelling mechanism or its log. Thus, for convenience of illustration, as in Fig. 1, the propeller shaft 32, is connected by a train of suitable bevel gearing 33, to drive a worm 34, that engages a worm rack 35, secured to the sleeve, to thereby convert the rotations of the propeller shaft or other driving mechanism into a longitudinal movement of the sleeve.

The stylus 13, may be an ink or pencil marker, or may be a metallic point, removably held in its carrier for change or renewal.

In operation, referring to the diagrams, Figs. 8 to 11 inclusive, assuming the stylus is located centrally at the south end of the chart a, and the vessel is moving due north, so long as this course is continued a straight line directed toward the north will be marked on the chart as in Fig. 8. If, after proceeding say, one hundred miles, the course of the vessel is changed to north-east as in Fig. 9, and its forward movement continued, the chart remaining with its north maintained north, the marking of the stylus will be directed to the north-east as in Fig. 10; and if after then keeping this course, say for two hundred miles, the course of the vessel be again changed to, say, due east, the continued marking of the stylus will be directed easterly as in Fig. 11. It will be noted that, not only will each point of variation of the course of the vessel be indicated in the chart, but that the distance traveled on each of its courses will be recorded.

While the present invention, as before stated, is particularly adapted to submarines, whose efficiency is enhanced by constant under-water travel, it is, however, also adapted to other vehicles such as automobiles, aeroplanes, dirigible balloons, and other conveyances in the sea, the air, and on the land, to thereby not only record the course of the vehicle, but its distance of travel, and its location at any time during the run.

While I have particularly described a stylus longitudinally movable with respect to the chart, it is obvious that the reverse may occur, that is to say, that the support for the chart, namely, the compass may be longitudinally moved with respect to the stylus, and that the latter may be simply free to move laterally. It is also apparent that the stylus may be guided by a north-maintained guide as in Fig. 1, wherein the head of the universal joint is represented as governed in position by a mariner's compass c, or its equivalent, just as the chart is north-maintained; the slotted head of the driving rod 20, acting as before described. It is furthermore obvious that the loose connections between the stylus and the driven rod may similarly be governed in position by a suitable compass. Many other changes and modifications will occur to those skilled in this art without effecting the scope hereof.

What is claimed is:

1. In combination, a compass chart, a carrier for the same, a stylus, and means for moving the stylus over the chart including coupling means adapted to be released on the angular displacement of said carrier in respect to said chart.

2. In combination, a compass chart, a carrier for the same, a stylus bearing on said chart, means for moving the stylus over said chart including a coupling member releasable on change in direction of movement of said stylus, said member having a loose connection with said stylus.

3. A compass chart, a universally supported stylus bearing on the chart, and driving means having a link connection with the stylus and including clutch means automatically releasable on change in direction of movement of said stylus.

4. A chart maintained fixed with respect to points of the compass and mounted on a power-propelled support, a stylus bearing on the chart, and coupling means between said power means and stylus adapted to release when the driving action on the stylus ceases.

5. A chart maintained in a fixed position with respect to north and south, a stylus bearing on the chart, driven means for moving the stylus over the chart, and automatically disconnective connections between said means and the stylus, whereby the latter may move independently of said means.

6. A chart maintained in a fixed position with respect to north and south, a stylus bearing on the chart, driven means connected with an operable part of the vehicle for moving the stylus over the chart, and automatically disconnective connections between said means and the stylus, whereby the latter may move with the chart independent of its driver.

7. A chart maintained in a fixed position with respect to north and south, a universally mounted and movable stylus bearing on the chart, and a right line driver connected to move the stylus over the chart.

8. A chart horizontally maintained in a fixed position with respect to north and south, a stylus bearing on the chart and supported on gimbals, and means for moving the stylus over the chart, no matter what the position of the chart with respect to the stylus.

9. A chart maintained in a fixed position with respect to points of the compass, a stylus arranged to trace its movements on the chart, a right line driver for the stylus, and connections allowing the lateral movement of the stylus with respect to its driver and axially unaffected by change in direction of said driver.

10. A gyroscopically north and south maintained chart, a stylus bearing thereon, means connected with the motive power of the vehicle for moving the stylus over the chart, and loose connections between the motive power and the stylus, whereby the latter may move independently of its motive power.

11. A chart maintained fixed with relation to points of the compass, a pendulous stylus bearing on the chart, a driving rod loosely engaging the stylus, a driving device for said rod and disconnective connections between the rod and device.

12. A chart maintained fixed with respect to points of the compass, a pendulous rod, a sleeved stylus guided by the rod to bear by gravity on the chart, a stylus driving member and laterally slotted connections between said member and stylus.

13. A chart maintained fixed with respect to points of the compass and mounted on a power-propelled support, a universally supported stylus adapted to be moved to any portion of the chart and means connected with the propelling mechanism for moving the stylus.

14. A chart maintained fixed with respect to points of the compass, a stylus bearing on the chart, a driving rod loosely engaging the stylus, a driving sleeve, a dog carried by the sleeve and means for causing the dog to clutch the rod when the sleeve is moved.

15. A chart, a stylus bearing on the chart, a driving rod loosely engaging the stylus, a driving sleeve, a dog carried by the sleeve, a drag-stem for causing the dog to clutch the rod when the sleeve is moved and a spring for moving the dog to its free position whenever the driving effect of the sleeve on the stylus ceases.

16. A chart adapted to remain fixed with respect to points of the compass and mounted on a power-propelled support, a universally mounted stylus bearing on said chart, a right line driver for moving the stylus over the chart, and connections between said power means and said driver.

17. A horizontally-supported chart adapted to remain fixed with respect to points of the compass and mounted on a power-propelled support, a gimbal-supported stylus bearing on said chart, and means for moving the stylus over said chart and actuated by said power means.

18. In a position indicator, a chart maintained in fixed position with respect to points of the compass, a stylus bearing on said chart, and means for moving the stylus over the chart and adapted to move about the axis of the stylus.

In testimony whereof I have signed my name to this specification in the presence of two subscribing witnesses.

HUDSON MAXIM.

Witnesses:
  LILIAN MAXIM,
  GEO. H. GRAHAM.